Jan. 27, 1959  R. E. JOHNSON ET AL  2,870,637
RATCHET CONTROL ASSEMBLY
Filed Feb. 21, 1957
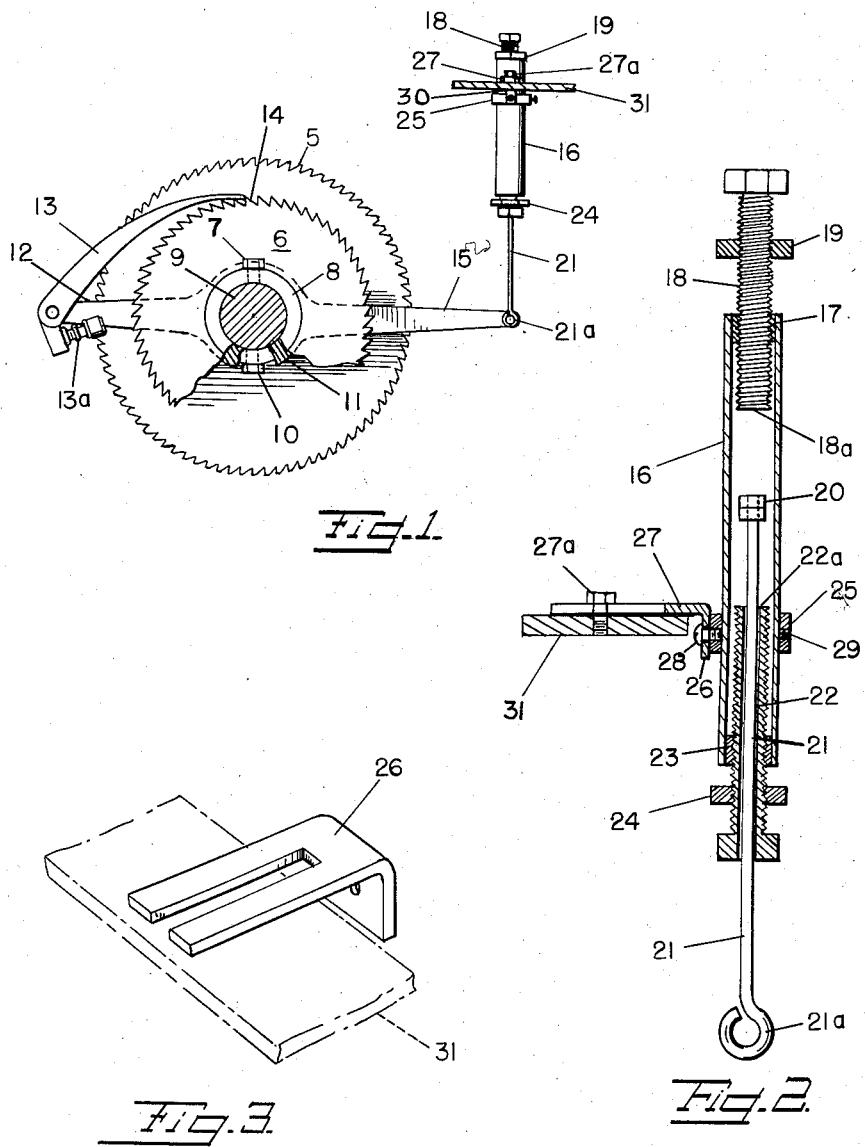
INVENTORS
ROY E. JOHNSON
ARTHUR H. JUSTICE
BY Shepherd & Campbell
ATTORNEYS

United States Patent Office 2,870,637
Patented Jan. 27, 1959

2,870,637
RATCHET CONTROL ASSEMBLY

Roy E. Johnson, Gastonia, and Arthur H. Justice, Belmont, N. C.

Application February 21, 1957, Serial No. 641,661

4 Claims. (Cl. 74—128)

This invention relates to a ratchet control assembly and its object is to provide improved means for effecting a very accurate step by step forward movement of a controlled element, such as a shaft, a gear, a crank or like machine element.

The device of the invention is of particular utility for use on spinning and twister machines in the textile industry, though it is not limited thereto.

The invention and its advantages will be best understood and appreciated after consideration of the accompanying drawings in which:

Fig. 1 is a side elevation of a mechanism constructed in accordance with the invention.

Fig. 2 illustrates in vertical section a tubular member which forms a principal element of the invention and in which view the tubular element has been given a quarter turn from its position in Fig. 1, and Fig. 3 is a perspective view of a bracket, to which the tubular member is pivotally connected, and by which vertical reciprocation is imparted to the tubular member.

In the drawing (Fig. 1) 5 designates any machine element, such as the gear wheel shown, to which a step by step movement is to be imparted by the actuation of a ratchet wheel 6. A set screw 7 through the hub 8 of the ratchet wheel binds the said wheel to a shaft 9. Gear 5 is also fixed to shaft 9 by a set screw 10. A yoke 11 rocks freely upon shaft 9. An extension 12 of this yoke has a pawl 13, pivoted thereto, which pawl engages the teeth 14 of the ratchet wheel, under the thrust of a compression spring 13a. The yoke has an actuating arm 15 extending therefrom. The parts so far described are found in conventional textile machines and the present invention relates particularly to a novel actuating means for the arm 15.

This actuating means comprises a tubular body member, 16, hereinafter referred to as a tube. A threaded bushing 17 fixed in the upper end of the tube has threaded engagement with a bolt 18. A lock nut 19 serves to bind the bolt in adjusted position, with its inner end projecting into the tube and there constituting an abutment 18a that is adapted to engage a head 20 upon the upper end of a link or rod 21. The lower end of this rod is provided with an eye 21a, said eye having pivotal engagement with the outer end of the actuating arm 15.

A tubular bolt 22 has threaded engagement in a bushing 23 that is fixed in the lower end of tube 16. A lock nut 24 binds the tubular screw 22 in its position of adjustment in tube 16. The upper end of screw 22 constitutes an abutment 22a that is adapted to engage the underside of the head 20.

A collar 25 surrounds tube 16, said collar, and consequently the tube 16, being pivotally supported from the downturned short leg 26 of an L-shaped bracket 27, by means of a pivot screw 28.

The collar 25 may be integral with the tube 16 or it may be secured to the tube by one or more set screws 29. The long arm of the bracket 27 may be forked, or otherwise formed, as at 30 to adapt it for ready engagement, as by a bolt 27a with any appropriate, vertically reciprocating part (indicated at 31) of a textile or other machine embodying an element requiring the step by step movement of gear 5.

Vertical reciprocation of the tube 16 imparts vertical reciprocation to the outer end of arm 15. However, this reciprocation is not constant but is rendered intermittent by the lost motion connection that is created by the fact that the rod 21 moves downwardly only when the top of head 20 is contacted by abutment 18a, and moves upwardly only when abutment 22a contacts the underside of head 20, and that the distance between the two abutments is much greater than the thickness of said head.

Since the distance between the abutment may be accurately and very finely adjusted by the threaded bolt 18 and tubular bolt 22 it follows that the structure described provides secure and reliable means for accurately adjusting the throw of pawl 13.

The pivoting of the tube 16 upon screw 28 permits said tube to have the necessary rocking movement to compensate for the fact that eye 21 moves in a slight arc.

The construction described not only provides for accurate initial adjustment of the throw of the parts but it insures that such adjustment will not be interfered with by the accumulation of foreign matter between the abutments. When devices of this sort are used upon textile machinery they are operating in an atmosphere filled with floating lint and small pieces of thread. When the operating parts are oiled, as they must be, this foreign matter collects upon and tends to gum up the parts. The throw of the ratchet must be accurately controlled since any erratic movement due to lint accumulation between the abutments 18a, 22a, and the top and bottom of head 20, could result in serious imperfections in the textiles produced.

The head 20 and abutments 18a and 22a being housed in the tube 16 may be properly lubricated without danger of the accumulation of lint or thread particles thereon. Thus complete accuracy of throw of the pawl 13 is assured.

It is to be understood that the invention is not limited to the precise construction shown but that it includes within its purview whatever changes fairly fall within either the terms or the spirit of the appended claims.

What we claim is:

1. Means for imparting an intermittent rotary movement to a driven shaft from a reciprocatory part operating in unison with said driven shaft, said means comprising a ratchet mechanism engaged with the driven shaft, which ratchet mechanism includes an actuating arm for the same, an adjustable lost motion connection between the reciprocatory part and said actuating arm, comprising a tube having closed sides, connections between the tube and the reciprocating part by which bodily endwise reciprocation is imparted to the tube, a bolt threaded into one end of the tube for bodily adjustment into and out of said tube, the inner end of said bolt forming an abutment, a tubular bolt threaded into the other end of the tube for adjustment into and out of said tube, the inner end of which constitutes an abutment, a rod slidably disposed in the bore of the tubular bolt, a head upon said rod located between the abutments of the first and second named bolts, the lower end of said rod being pivotally engaged with the actuating arm of the ratchet mechanism, the head of the rod and the said abutments being housed in the closed tube and there protected against the accumulation of foreign matter between head and abutments.

2. A structure as recited in claim 1 in combination with means for locking both of said bolts against rotative movement with respect to said tube.

3. Means for imparting an intermittent rotary movement to a driven element from a reciprocatory part operating in relation to said driven element, said means comprising a ratchet mechanism engaged with the driven element which ratchet mechanism includes an actuating arm for the same, a tube, connections between the tube and the reciprocating part by which bodily endwise reciprocation is imparted to the tube, a bolt threaded into the upper end of the tube and projecting far enough into said tube to constitute a first abutment, means at the lower end of the tube constituting a second abutment, a rod freely slidable with respect to the tube and which passes through the lower abutment the inner end of which rod carries a head the upper and lower faces of which are engaged alternately by the first and second abutments under the bodily reciprocation of the tube, to provide an adjustable lost motion connection between the reciprocatory part and the driven element, the lower end of the rod being pivotally engaged with the actuating arm of the ratchet mechanism.

4. A structure as recited in claim 1 wherein the connection between the reciprocatory part and tube comprises a pivotal mounting which permits oscillation of the tube to accommodate arcuate movement of the outer end of the said actuating arm.

References Cited in the file of this patent

UNITED STATES PATENTS

| 2,541,964 | Hennings | Feb. 13, 1951 |
| 2,688,386 | Crookston | Sept. 7, 1954 |

FOREIGN PATENTS

| 421,989 | France | Mar. 9, 1911 |